(12) United States Patent
Patel (10) Patent No.: US 11,850,832 B2
(45) Date of Patent: Dec. 26, 2023

(54) LUMINESCENT BLADDERS, LUMINESCENT ARTICLES, METHODS OF MAKING LUMINESCENT BLADDERS AND METHODS OF MAKING LUMINESCENT ARTICLES

(71) Applicant: NIKE, Inc., Beaverton, OR (US)

(72) Inventor: Romesh Patel, Beaverton, OR (US)

(73) Assignee: NIKE, INC., Beaverton, OR (US)

( * ) Notice: Subject to any disclaimer, the term of this patent is extended or adjusted under 35 U.S.C. 154(b) by 0 days.

(21) Appl. No.: 18/059,488

(22) Filed: Nov. 29, 2022

(65) Prior Publication Data

US 2023/0104191 A1    Apr. 6, 2023

Related U.S. Application Data

(63) Continuation of application No. 16/639,289, filed as application No. PCT/US2018/044784 on Aug. 1, 2018, now Pat. No. 11,541,624.

(60) Provisional application No. 62/547,301, filed on Aug. 18, 2017.

(51) Int. Cl.
*B32B 3/04*    (2006.01)
*B32B 27/08*   (2006.01)
*B32B 27/40*   (2006.01)

(52) U.S. Cl.
CPC ............. *B32B 3/04* (2013.01); *B32B 27/08* (2013.01); *B32B 27/40* (2013.01); *B32B 2264/102* (2013.01); *B32B 2307/4023* (2013.01); *B32B 2307/422* (2013.01); *B32B 2307/7242* (2013.01); *B32B 2437/02* (2013.01)

(58) Field of Classification Search
CPC .......... B32B 3/04; B32B 27/08; B32B 27/40; B32B 2264/102; B32B 2307/4023; B32B 2307/422; B32B 2307/7242

USPC ..................................... 428/321.1
See application file for complete search history.

(56) References Cited

U.S. PATENT DOCUMENTS

| | | | |
|---|---|---|---|
| 3,774,022 A | 11/1973 | Dubrow et al. | |
| 4,183,536 A | 1/1980 | Platt | |
| 5,394,824 A | 3/1995 | Johnson, Jr. | |
| 5,562,290 A | 10/1996 | Wei | |
| 5,860,727 A * | 1/1999 | Chien ................ | H05B 33/02 36/137 |
| 5,865,523 A * | 2/1999 | Chien ................ | H05B 33/02 36/137 |
| 6,013,340 A | 1/2000 | Bonk et al. | |

(Continued)

FOREIGN PATENT DOCUMENTS

FR    2832318 A1    5/2003
JP    2008136953 A    6/2008

OTHER PUBLICATIONS

International Search Report and Written Opinion for PCT/US2018/044784 dated Oct. 16, 2018.

(Continued)

*Primary Examiner* — Betelhem Shewareged
(74) *Attorney, Agent, or Firm* — THOMAS | HORSTEMEYER, LLP (57) ABSTRACT

The present disclosure is directed to articles such as bladders comprising mechano-luminescent materials which emit light when the mechano-luminescent materials are placed under stress. The present disclosure is also directed to articles including these bladders, methods of forming these bladders, and methods of making articles including these bladders.

17 Claims, 2 Drawing Sheets

(56) References Cited

U.S. PATENT DOCUMENTS

| | | | |
|---|---|---|---|
| 7,140,972 B2 | 11/2006 | Redwine et al. | |
| 7,772,315 B2 | 8/2010 | Lee et al. | |
| 8,801,530 B2 | 8/2014 | Beck et al. | |
| 9,074,129 B2 | 7/2015 | Fraser et al. | |
| 11,541,624 B2* | 1/2023 | Patel | A41D 13/01 |
| 2002/0091011 A1 | 7/2002 | Sosin | |
| 2005/0132609 A1* | 6/2005 | Dojan | A43B 21/28 36/29 |
| 2006/0035079 A1 | 2/2006 | Xu et al. | |
| 2007/0000605 A1 | 1/2007 | Millette et al. | |
| 2007/0087862 A1 | 4/2007 | Redwine et al. | |
| 2007/0259598 A1 | 11/2007 | Ribi | |
| 2008/0019119 A1 | 1/2008 | Marston | |
| 2009/0158622 A1 | 6/2009 | Cook et al. | |
| 2011/0140057 A1 | 6/2011 | Ribi | |
| 2013/0077148 A1 | 3/2013 | Ribi | |
| 2013/0250229 A1 | 9/2013 | Kaneiwa et al. | |
| 2014/0221528 A1 | 8/2014 | Ribi | |
| 2016/0041177 A1 | 2/2016 | Brayman et al. | |
| 2016/0053172 A1 | 2/2016 | Mori et al. | |
| 2016/0310803 A1 | 10/2016 | Yu | |
| 2016/0354502 A1 | 12/2016 | Simmons et al. | |
| 2017/0002264 A1 | 1/2017 | Kawataki et al. | |
| 2020/0253319 A1 | 8/2020 | Patel | |

OTHER PUBLICATIONS

International Preliminary Report on Patentability for PCT/US2018/044784 dated Oct. 22, 2019.

* cited by examiner

LUMINESCENT BLADDERS, LUMINESCENT ARTICLES, METHODS OF MAKING LUMINESCENT BLADDERS AND METHODS OF MAKING LUMINESCENT ARTICLES

CROSS-REFERENCE TO RELATED APPLICATIONS

This application is a continuation of U.S. patent application entitled "LUMINESCENT BLADDERS, LUMINESCENT ARTICLES, METHODS OF MAKING LUMINESCENT BLADDERS AND METHODS OF MAKING LUMINESCENT ARTICLES," having application Ser. No. 16/639,289, filed Feb. 14, 2020, which is the 35 U.S.C. § 371 national stage application entitled "LUMINESCENT BLADDERS, LUMINESCENT ARTICLES, METHODS OF MAKING LUMINESCENT BLADDERS AND METHODS OF MAKING LUMINESCENT ARTICLES," having PCT Application No. PCT/US2018/044784, filed Aug. 1, 2018, which claims the benefit of and priority to U.S. Provisional application entitled "LUMINESCENT BLADDERS, LUMINESCENT ARTICLES, METHODS OF MAKING LUMINESCENT BLADDERS AND METHODS OF MAKING LUMINESCENT ARTICLES," having Application Ser. No. 62/547,301, filed Aug. 18, 2017, the disclosure of which is incorporated herein by reference in their entireties.

BACKGROUND

Safety is always a concern when walking or performing activities at night or in low light level conditions. Clothing, sporting equipment and footwear often include reflective regions to reflect light from automobile headlights, street lights, and the like. In other instances light emitting diodes (LEDs) can be used to produce light

DESCRIPTION

The present disclosure is directed to articles such as bladders comprising mechano-luminescent material(s) which emit light when the mechano-luminescent material is placed under stress. In the bladders of the present disclosure, a composition comprising the mechano-luminescent material is positioned in a location within the bladder, on an internal surface of the bladder, and/or on an external surface of the bladder, where a mechanical stress is or can be applied to the mechano-luminescent material. For example, a mechano-luminescent composition including the mechano-luminescent material can be applied to the bladder in a location where mechanical stress will be applied to it when walking or running in a pair of shoes that include the bladder as a cushioning element. The present disclosure is also directed to articles including these bladders, methods of forming these bladders, and methods of making articles including these bladders. In particular, these bladders can be incorporated into articles including footwear, clothing and sporting equipment. Unlike previous solutions such as using reflective materials which require the presence of an external light source or LEDs which require an external power source, the bladders of the present disclosure emit light when placed under stress, and so do not require external light or power sources in order to illuminate a wearer.

In one aspect, the present disclosure is directed to an article comprising: a bladder including a volume of a fluid, wherein the bladder has a first bladder wall having a first bladder wall thickness, wherein the first bladder wall has a gas transmission rate of 15 $cm^3/m^2 \cdot atm \cdot day$ or less for nitrogen for an average wall thickness of 20 mils, wherein the bladder comprises a mechano-luminescent composition comprising one or more mechano-luminescent materials, and wherein the bladder has the characteristic that when the one or more mechano-luminescent materials is under a first mechanical stress, the mechano-luminescent material emits a first light.

In another aspect, the present disclosure is directed to an article of footwear, comprising a sole structure, wherein the sole structure includes a bladder. The bladder can include the bladder described above or any one described herein or in the claims.

In another aspect, the present disclosure is directed to an article of sporting equipment comprising at least one shoulder strap, wherein the at least one shoulder strap includes an article. The article can include a bladder such as described above or any one described herein or in the claims.

In another aspect, the present disclosure is directed to a method of making a bladder, comprising: providing a film, wherein the film has a gas transmission rate of 15 $cm^3/m^2 \cdot atm \cdot day$ or less for nitrogen for an average film thickness of 20 mils; applying heat, pressure and/or vacuum to the film, forming a bladder, the bladder including at least one stress region; and before, during or after the step of forming the bladder, applying a mechano-luminescent material composition including one or more of mechano-luminescent materials onto the film in at least one location, wherein, following the forming the bladder, the at least one location is a location of the at least one stress region; wherein the bladder has the characteristic that when the stress region is under a first mechanical stress, the mechano-luminescent material emits the first light as a result of the first mechanical stress.

In another aspect, the present disclosure is directed to a method of making a bladder, comprising: providing a bladder, wherein the bladder includes at least one stress region; and applying a mechano-luminescent material composition including one or more of mechano-luminescent materials onto at least one stress region, wherein the bladder has the characteristic that when the stress region is under a first mechanical stress, the mechano-luminescent material emits the first light as a result of the first mechanical stress.

In another aspect, the present disclosure is directed to a bladder comprising: a product of one of the methods above, described herein, or in the claims.

In another aspect, the present disclosure is directed to a method of making an article of footwear, comprising: providing an upper, providing a bladder; and affixing the upper and the bladder to one another. The bladder can include the bladder described above or any one described herein or in the claims.

In an aspect, the bladder can include a second luminescent material used in conjunction with the mechano-luminescent materials to produce a second light, which can have a more intense and/or longer lifetime than the light produced from the mechano-luminescent materials and/or emit at a wavelength of a different color. As described herein, the second luminescent material and the mechano-luminescent material are in close proximity to one another to facilitate energy transfer.

In an aspect, the bladder can be incorporated into an article such as footwear or clothing apparel. In this regard, one or more portions of the bladder can be exposed (e.g., not covered) so that when the mechano-luminescent materials are exposed to mechanical stress, light from the mechano-luminescent material and/or the luminescent material can radiate from the article, and be seen by a person observing the article. For example, the bladder can be used in the sole of a shoe, where one or more portions of the bladder are exposed so that when mechanical stress is applied on the mechano-luminescent materials, light radiates from the sole of the shoe. In this regard, a first person can see light radiating from a shoe including the bladder (e.g., in the sole) of a second person walking or running. The action of walking or running subjects the mechano-luminescent material to mechanical stress, which produces the light from the mechano-luminescent material and/or the luminescent material.

In an aspect, the present disclosure can provide articles that enhance safety, for example, in the evening, night, or other low light visibility conditions, since the article will radiate light. This can be advantageous since the article will not need any source of electrical energy (e.g., automobile headlight or a battery) to produce the light. Rather, mechanical stress from walking, running, or the like is used to produce the light from the mechano-luminescent materials.

In another aspect, the present disclosure provides for one or more ways to produce the bladder. In an aspect, the method of making a bladder can include: providing a film, wherein the film has a gas transmission rate of 15 cm$^3$/m$^2$·atm·day or less for nitrogen for an average film thickness of 20 mils; applying heat, pressure and/or vacuum to the film, forming a bladder, the bladder including at least one stress region; and before, during or after the step of forming the bladder, applying a mechano-luminescent material composition including one or more of mechano-luminescent materials onto the film in at least one location, wherein, following the forming the bladder, the at least one location is a location of the at least one stress region; wherein the bladder has the characteristic that when the stress region is under a first mechanical stress, the mechano-luminescent material emits the first light as a result of the first mechanical stress. In another aspect, the bladder can be made by applying a mechano-luminescent material composition including one or more of mechano-luminescent materials and optionally a second luminescent material onto at least one stress region of the bladder. In an aspect, the mechano-luminescent material composition and optionally the second luminescent material can be applied to an outer surface of the bladder, an inner surface of the bladder, or both.

In an aspect, the bladder can be incorporated into a number of different types of articles of manufacture. For example, the bladder can be used as a cushioning element once inflated (e.g., fluid-filled bladder). In particular, the articles of manufacture can include footwear (e.g., dress shoes, athletic footwear, hiking boots, work boots, or the like), skates (e.g., hockey skates, figure skates, in-line skates, roller skates, or the like), apparel, balls (e.g., soccer balls, footballs, basketballs, kickballs, etc.), striking devices (e.g., bats, rackets, sticks, mallets, golf clubs, paddles, etc.), athletic equipment (e.g., golf bags, baseball and football gloves, soccer ball restriction structures), protective equipment (e.g., pads, helmets, guards, visors, masks, goggles, shin guards, hockey gloves, chest protectors, etc.), bags (e.g., straps of a backpack), bicycle seats, saddles, article of furniture, or novelty item. In an aspect, when used in footwear or skates, the bladder can be used as a cushioning element as a component of a sole structure. In an aspect, the bladder can be used as a cushioning element in the strap of a backpack or other bag.

The article of footwear of the present disclosure may be designed for a variety of uses, such as sporting, athletic, military, work-related, recreational, or casual use. In aspects, the article of footwear is designed use in outdoor sporting activities, such as global football/soccer, golf, American football, rugby, baseball, running, track and field, cycling (e.g., road cycling and mountain biking), and the like. The article of footwear can optionally include traction elements (e.g., lugs, cleats, studs, and spikes as well as tread patterns) to provide traction on soft and slippery surfaces. Cleats, studs and spikes are commonly included in footwear designed for use in sports such as global football/soccer, golf, American football, rugby, baseball, and the like, which are frequently played on unpaved surfaces. Lugs and/or exaggerated tread patterns are commonly included in footwear including boots design for use under rugged outdoor conditions, such as trail running, hiking, and military use.

When the bladder is incorporated into footwear, the bladder can be incorporated into a sole which can be affixed to an upper as well as other components to form the footwear. In an aspect, the sole and/or upper can be designed so that one or more portions of the bladder are not covered up, include an opening, or otherwise exposed so that the first light, the second light, or both radiate out from the footwear.

Figure 1:
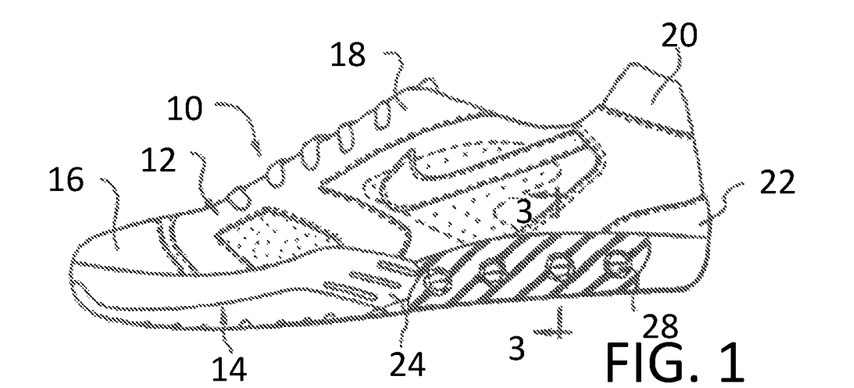
FIG. 1 is a side elevational view of an athletic shoe with a portion of the midsole cut-a-way to expose a cross-sectional view.
Figure 2:
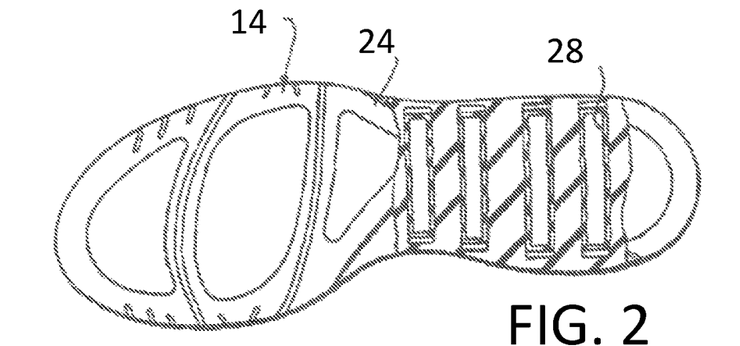
FIG. 2 is a bottom elevational view of the athletic shoe of FIG. 1 with a portion cut-a-way to expose another cross-sectional view.
Figure 3:
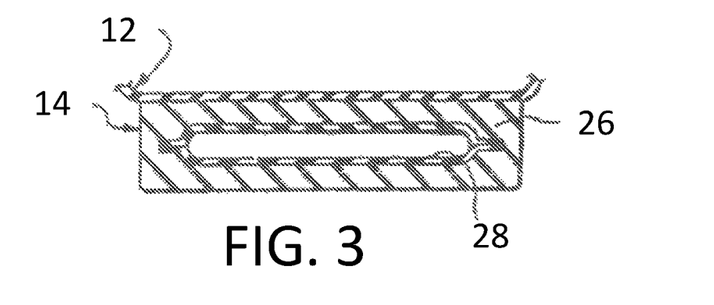
FIG. 3 is a section view taken along line 3-3 of FIG. 1.

FIGS. 1-3 show an athletic shoe including a sole structure and a cushioning device fabricated from a bladder of the present disclosure. The shoe 10 includes a shoe upper 12 to which the sole 14 is attached. The shoe upper 12 can be formed from a variety of conventional materials including, e.g., leathers, vinyls, nylons and other generally woven fibrous materials. Typically, the shoe upper 12 includes reinforcements located around the toe 16, the lacing eyelets 18, the top of the shoe 20 and along the heel area 22. As with most athletic shoes, the sole 14 extends generally the entire length of the shoe 10 from the toe region 16 through the arch region 24 and back to the heel portion 22.

The sole 14 includes one or more bladders 28 disposed in the mid-sole 26 of the sole structure. The bladder 28 can be formed having various geometries such as a plurality of tubular members positioned in a spaced apart, parallel relationship to each other within the heel region 22 of the mid-sole 26. Numerous other geometries can be used and bladders of the present disclosure are not limited to the one shown in FIGS. 1-2. The tubular members 28 are sealed bladders containing an injected captive gas.

Figure 4:
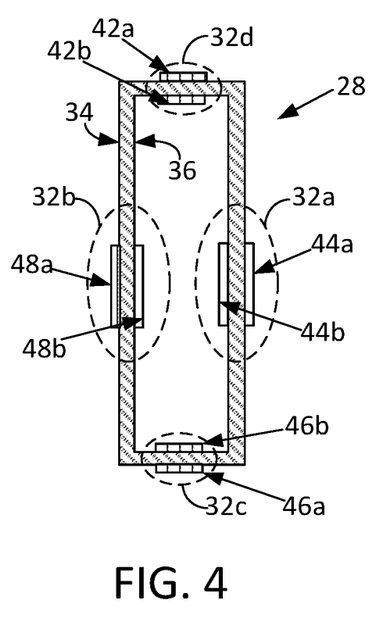
FIG. 4 illustrates a bladder including the mechano-luminescent material composition and/or the second luminescent material.

FIG. 4 illustrates a bladder 28 including the mechano-luminescent material composition and/or the second luminescent material. The bladder 28 includes an outside surface 34 and inside surface 36. The bladder 28 can include one or more stress regions 32a, 32b, 32c, and/or 32d. The stress regions shown are only exemplary and one or more of these can be present and other stress regions not shown can be included. In each of the stress regions 32a, 32b, 32c, and 32d the mechano-luminescent material composition and/or the second luminescent material are shown on the outside (42a, 44a, 46a, and 48a) and the inside (42b, 44b, 46b, and 48b). The mechano-luminescent material composition and/or the second luminescent material can be disposed in other areas not illustrated.

Figure 5:
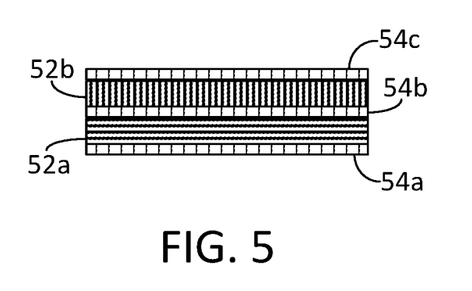
FIG. 5 illustrates a cross-section of a portion of the bladder having two polymeric layers.

FIG. 5 illustrates a cross-section of a portion of the bladder having two polymeric layers 52a and 52b. The mechano-luminescent material composition and/or the second luminescent material 54a, 54b, and 54c can be disposed in, on or in one or more of the polymeric layers or between the polymeric layers 52a and 52b.

Now having described aspects of the present disclosure in general, additional details are provided. In an aspect, the article includes a bladder capable of including a volume of a fluid. An unfilled bladder can be referred to as a fluid-fillable bladder and a filled bladder can be referred to as a fluid-filled bladder. The bladder can include a fluid such as a gas or liquid. In an aspect, the gas can include air, $N_2$, or other appropriate gas.

In an aspect, the inflated bladder can have a gas transmission rate for nitrogen gas, for example, where a bladder wall of a given thickness has a gas transmission rate for nitrogen that is at least about ten times lower than the gas transmission rate for nitrogen of a butyl rubber layer of substantially the same thickness as the thickness of the multi-layered structure. In an aspect, the bladder has a first bladder wall having a first bladder wall thickness (e.g., about 0.1 to 40 mils). In an aspect, the bladder has a first bladder wall that can have a gas transmission rate (GTR) for nitrogen gas of less than about 15 $cm^3/m^2 \cdot atm \cdot day$, less than about 10 $m^3/m^2 \cdot atm \cdot day$, less than about 5 $cm^3/m^2 \cdot atm \cdot day$, less than about 1 $cm^3/m^2 \cdot atm \cdot day$ (e.g., from about 0.001 $cm^3/m^2 \cdot atm \cdot day$ to about 1 $cm^3/m^2 \cdot atm \cdot day$, about 0.01 $cm^3/m^2 \cdot atm \cdot day$ to about 1 $cm^3/m^2 \cdot atm \cdot day$ or about 0.1 $cm^3/m^2 \cdot atm \cdot day$ to about 1 $cm^3/m^2 \cdot atm \cdot day$) for an average wall thickness of 20 mils. An accepted method for measuring the relative permeance, permeability, and diffusion of inflated bladders is ASTM D-1434-82-V. See, e.g., U.S. Pat. No. 6,127,026, which is incorporated by reference as if fully set forth herein. According to ASTM D-1434-82-V, permeance, permeability and diffusion are measured by the following formulae:

Permeance (quantity of gas)/[(area)×(time)×(pressure difference)]=permeance (GTR)/(pressure difference)= $cm^3/m^2 \cdot atm \cdot day$ (i.e., 24 hours)

Permeability

[(quantity of gas)×(film thickness)][(area)×(time)× (pressure difference)]=permeability

[(GTR)×(film thickness)]/(pressure difference)= [($cm^3$)(mil)]/$m^2 \cdot atm \cdot day$ (i.e., 24 hours)

Diffusion at One Atmosphere (quantity of gas)/[(area)×(time)]=GTR=$cm^3/m^2$ day (i.e., 24 hours)

In an aspect, the bladder can include a mechano-luminescent composition comprising one or more mechano-luminescent materials. In an aspect, the mechano-luminescent composition can consist of one or more mechano-luminescent materials. In an aspect, the one or more mechano-luminescent material can be a solid material, such as solid particles. A mechano-luminescent material is mechano-luminescent, which means that the material emits light energy (photons) as a result of a mechanical action being applied to the material. Placement of the mechano-luminescent material in an area or region that may be subject to mechanical stress can result in emission of light upon application of the mechanical stress in that area or region.

In an aspect, the mechano-luminescent material can be an aluminate mechano-luminescent material. In an aspect, the aluminate mechano-luminescent material can be an alkaline earth aluminate mechano-luminescent material such as a strontium aluminate mechano-luminescent material, a mechano-luminescent material comprising strontium aluminate and europium, or the like. Exemplary examples of mechano-luminescent material are provided below.

In an aspect, the strontium aluminate can be a compound represented by $Sr_xAl_yO_z$, where $0<X$, $0<y$, and $0<Z$. In an aspect, the strontium aluminate can include compounds such as $SrAl_2O_4$, $SrAl_4O_7$, $Sr_4Al_4O_{25}$, $SrAl_{12}O_{19}$, and $Sr_3Al_2O_6$.

In an aspect, the aluminate mechano-luminescent material can be represented by the formula: $Sr_xAl_yO_z$:Eu, M (where $0<X$, $0<y$, $0<Z$). In an aspect, the aluminate mechano-luminescent material including europium (Eu) ion be in an amount of about 0.0001 to 0.01 mol, about 0.0005 to 0.01 mol, or about 0.0005 to 0.005 mol, per mole of the strontium aluminate.

In an aspect, the aluminate mechano-luminescent material can be represented by the formula: $Sr_xAl_yO_z$:Eu, M (where $0<X, 0<y, 0<Z$, and M is at least one selected from the group consisting of Nd, Dy, and Ho). In an aspect, the aluminate mechano-luminescent material including europium (Eu) ion be in an amount of about 0.0001 to 0.01 mol, about 0.0005 to 0.01 mol, or about 0.0005 to 0.005 mol, per mole of the strontium aluminate. In an aspect, the aluminate mechano-luminescent material includes Nd, Dy, and/or Ho, individually, in an amount of about 0.0001 to 0.01 mol, about 0.0005 to 0.01 mol, and about 0.0005 to 0.005 mol, per mole of the strontium aluminate.

As long as the aluminate mechano-luminescent material includes at least one ion selected from Nd, Dy, and Ho, it may further contain another co-activator. Examples of co-activators include one or more of the following elements: Sc, Y, La, Ce, Pr, Pm, Sm, Gd, Tb, Er, Tm, Yb, Lu, and the like. Examples of the compounds to be added in practical use include carbonates, oxides, chlorides, sulfates, nitrates, acetates, and the like of the above elements. The amounts of these compounds or ions can appropriately be adjusted on the basis of the conventional knowledge or through usual experiments.

In as aspect, the aluminate mechano-luminescent material can include a europium-activated strontium aluminate/phosphate mixture, where the phosphate forms a layer on the europium-activated strontium aluminate particles. In an aspect, the europium-activated strontium aluminate/phosphate mixture can include 0.2 to 5.0 parts by weight of phosphorus, as elemental phosphorus, derived from the phosphate compound relative to 100 parts by weight of the europium-activated strontium aluminate particles. In an aspect, the phosphate compound can include inorganic phosphate, organic phosphate, and phosphoric acid. The term "phosphate" as used herein refers to both normal salt and hydrogen salt. In an aspect, the phosphate is can be selected from ammonium phosphate, sodium phosphate, potassium phosphate, sodium polyphosphate, sodium hexametaphosphate, and phosphoric acid.

In another aspect, the aluminate mechano-luminescent material can be an alkaline earth aluminate represented by the following:
$M_xAl_2O_{3+x}$, $M_xQAl_{10}O_{16+x}$, $M_{x1}Q_{x2}Al_2O_{3+x1+x2}$ or $M_{x1}Q_{x2}LAl_{10}O_{16+x1+x2}$,
in which M, Q and L are each an alkaline earth metal element selected from the group consisting of magnesium, calcium, strontium and barium, x is a positive number larger than 0.8 but smaller than 1.0 and x1 and x2 are each 0 or a positive number with the proviso that (x1+x2) is a positive number larger than 0.8 but smaller than 1.0. Examples include $Sr_xAl_2O_{3+x}$ or $Sr_xMgAl_{10}O_{16+x}$.

In another aspect, the aluminate mechano-luminescent material can be a composite metal oxide containing strontium and aluminum as a base material and doping it with a rare earth metal or a transition metal as a luminescent center. In an aspect, the aluminate mechano-luminescent material can be represented by: $xSrO \cdot yAl_2O_3 \cdot zMO$ (M is a divalent metal such as Mg, Ca, or Ba; x, y and z are integers), and $xSrO \cdot yAl_2O_3 \cdot zSiO_2$ (x, y and z are integers). Example of the aluminate mechano-luminescent material include $SrMgAl_{10}O_{17}$:Eu, $(Sr_xBa_{1-x})Al_2O_4$:Eu (0<x<1), $SrAl_2SiO_7$:Eu, $SrMgAl_{10}O_{17}$:Eu, $SrAl_6O_{11}$:Eu, $SrLaAl_3O_7$:Eu, $SrYAl_3O_7$:Eu, and $SrAl_2SiO_7$:Eu.

In an aspect, the mechano-luminescent material can be about 0.001% to 20% by weight of the mechano-luminescent composition. The amount used for a particular application can depend upon the type of mechano-luminescent material, the other components in the composition, the desired result, and the like. Also, the amount applied to an area of interest can depend upon the desired result, and can cover an area for 0.1 cm² to 100 cm² or more depending upon the application and desired result.

As mentioned above, the bladder can include the mechano-luminescent material and a second luminescent material such as a photoluminescent material. Photoluminescence is an emission of light after the absorption of incident light. In an aspect, incident radiation (e.g., first light energy) from the mechano-luminescent material is absorbed by luminescent material (e.g., photoluminescent material), which emits an emitted radiation (e.g. a second light energy). In an aspect, the second luminescent material and the mechano-luminescent material are located in proximity to each other to achieve energy transfer from the mechano-luminescent material to the second luminescent material. In an aspect, the mechano-luminescent material composition can include the photoluminescent material. In another aspect, bladder can include the mechano-luminescent material composition and separate a photoluminescent material composition including the photoluminescent material. For example, a first layer of mechano-luminescent material composition can be disposed on a surface of the bladder and then a second layer of photoluminescent material can be disposed on the first layer or vice versa. Also, two or more layers of each can be disposed on one in an alternating manner.

In an aspect, the emitted radiation from the photoluminescent material can have an intensity at least about 10% greater than the intensity of the incident radiation from the mechano-luminescent material. In an aspect, the emitted radiation from the photoluminescent material can have a duration at least about 10% greater than the duration of the incident radiation from the mechano-luminescent material. In an aspect, the emitted radiation of the photoluminescent material can be in the visible light spectrum.

In an aspect, the photoluminescent material can include: organic photoluminescent materials, monomeric or polymeric photoluminescent materials, inorganic photoluminescent materials, organometallic photoluminescent materials, and combinations thereof, where the photoluminescent material absorbs the incident radiation from the mechano-luminescent material. In addition, the emitted radiation from the photoluminescent material is within the visible light spectrum, at least about 10% or more duration, and/or at least about 10% or more intensity than the incident radiation of the mechano-luminescent material. In an aspect, the photoluminescent material can include phosphor materials that include transition metal compounds and/or rare earth compounds.

In an aspect, the mechano-luminescent composition can further comprise a second luminescent material. In other words, the mechano-luminescent material and the second luminescent material can be mixed together into a single composition. For example, the second luminescent material and the mechano-luminescent material can be mixed with a polymeric material such as one of those described herein. The ratio of the amount of the second luminescent material and the mechano-luminescent material can be about 1:10 to 10:1 based on the selected second luminescent material and the mechano-luminescent material, the desired outcome, and the like. When the second luminescent material and the mechano-luminescent material are in a single composition, the amount of each independently can be about 0.001% to 20% by weight of the mechano-luminescent material composition. The components can be mixed using known techniques.

In an aspect, the mechano-luminescent material composition can comprise a polymeric material. For example, the mechano-luminescent material, and, when present, the second luminescent material can be included in (e.g., suspended) in a polymeric material. In an aspect, the polymeric material of the mechano-luminescent composition can include thermoplastic resins, thermosetting resins, and combinations thereof. In an aspect, the thermoplastic resin can include polyethylene (e.g., low-density polyethylene, medium-density polyethylene, high-density polyethylene, and linear low-density polyethylene), polypropylene, polystyrene, polyvinyl chloride, polyvinyl fluoride, polyvinylidene chloride, styrene polymers or copolymers (e.g., acrylonitrile-butadiene-styrene copolymers (ABS resin)), polyamide (e.g., 6-nylon, 66-nylon, and 12-nylon), polyamide-imide, polyimide, polyetherimide, polyurethane, acrylic resins (e.g., polymethyl methacrylate, polyvinyl acetate, ethylene-vinyl acetate copolymers), fluororesins (e.g., polyvinylidene fluoride and polytetrafluoroethylene), alkenyl aromatic resins, polyesters (e.g., polyethylene terephthalate, polybutylene terephthalate, polyethylene naphthalate, and polylactic acid), polycarbonates (e.g., bisphenol A-type polycarbonate), polyacetal, polyphenylene sulfide, polymethyl pentene, cellulose, polyvinyl alcohol, polyvinyl acetal, polyacrylic acids (e.g., polyacrylonitrile, styrene-acrylonitrile copolymers (AS resin)), polyphenylene ether (PPE), modified PPE, polyarylate, polyphenylene sulfide, polysulfone, polyether sulfone, polyether nitrile, polyether ketone, polyketone, liquid crystal polymers, ethylene-propylene copolymers, copolymers of ethylene or propylene and another α-olefin (e.g., butene-1, pentene-1, hexene-1, 4-methyl pentene-1), copolymers of ethylene and another unsaturated ethylenic monomer (e.g., vinyl acetate, acrylic acid, acrylic acid ester, methacrylic acid, methacrylic acid ester, vinyl alcohol), combinations thereof, copolymers thereof, and the like. In an aspect, the thermoplastic resins may also include rubbery materials such as natural rubber, polyisoprene rubber, styrene-butadiene rubber, polybutadiene rubber, ethylene-propylene-diene rubber, butyl rubber, chloroprene rubber, acrylonitrile-butadiene rubber, silicone rubber, combinations thereof.

In an aspect, the thermosetting resin can include phenol resin, urea resin, melamine resin, unsaturated polyester resin, diallyl phthalate resin, epoxy resin, silicone resin, alkyd resin, polyimide, poly(amino bismaleimide), casein resin, fran resin, urethane resin and combinations thereof, copolymers thereof and the like. Further, resins curable by ultraviolet rays or radiation may be mentioned.

In an aspect, the mechano-luminescent composition, the second luminescent material, polymeric material, combinations thereof, can optionally include additives, fillers, pigments, lubricants, antioxidants, ultraviolet absorbers, antistatic agents, flame retardants, fungicides, antibacterial agents, combinations thereof, or the like. In addition, mechano-luminescent composition, the second luminescent material, polymeric material, combinations thereof, can optionally include monomers, oligomers, crosslinking agents, thermal initiators, photoinitiators, and catalysts.

In certain aspects, the additives can include, but are not limited to, processing agents, anti-oxidants, ultraviolet stabilizers, optical brighteners, extenders, solid and liquid colorants, fillers, pigments, coupling agents, plasticizers, rheology modifiers, stabilizers, delusterants, antimicrobial agents, antistatic agents, and other functional additives, and combinations of additives.

In certain aspect, the fillers can be utilized to increase strength of the material, abrasion resistance, modify thermal properties, reduce cost, and alter viscosity, thixotropy or overall fluid flow properties of the elastomer composition. The amount of filler (in terms of "phr" or parts by weight based on 100 parts of the elastomer, for example) can be varied to achieve the desired effective property such as strength, viscosity, and the like.

In certain aspects, the filler can include, but is not limited to, clay, talc, asbestos, graphite, glass, mica (such as phologopite, biotie, zinnwaldite, muscovite, paragonite, celadonite and glauconite, clinochlore, chamosite, nimite, pennantite, sudoite, donbasite, clintonite, margarite, thulite, antigorite, lizardite, chrysotile, mesite, cronstedite, berthierine, greenalite, garnierite, and the like), calcium metasilicate, alumina, zinc sulfide, aluminum hydroxide, silica (such as amorphous silica, amorphous synthesized silica, and colloidal silica), silicates (such as actinolite, tourmaline, serpentine, aluminosilicates, and the like), silicon carbide, diatomaceous earth, carbonates (such as barium carbonate, calcium carbonate, magnesium carbonate and the like), kaolin (such as delaminated kaolin, calcined kaolin, and the like), metals (such as titanium, tungsten, zinc, aluminum, bismuth, nickel, molybdenum, iron, copper, brass, boron, bronze, cobalt, beryllium, and alloys of these), metal oxides (such as zinc oxide, iron oxide, aluminum oxide, titanium oxide, magnesium oxide, zirconium oxide and the like), suitable organic fillers include, but are not limited to, carbon black, fullerene and/or carbon nanotubes, melamine colophony, cellulose fibers, polyamide fibers, polyacrylonitrile fibers, polyurethane fibers, polyester fibers based on aromatic and/aliphatic dicarboxylic acid esters, carbon fibers or mixtures thereof, particulate synthetic plastics (such as high molecular weight polyethylene, polypropylene, polystyrene, polyethylene ionomeric resins, polyamide, polyester, polyurethane, polyimide, and the like), particulate carbonaceous materials (such as carbon black and the like), sulfates (such as calcium sulfate, magnesium sulfate, barium sulfate, and the like) as well as cotton flock, cellulose flock, cellulose pulp, leather fiber, and combinations of any of the above. In certain aspects, the disclosed fillers can be spherical, needle-like, plate type forms and the like, or irregular forms. In certain aspects, the filler can be a high aspect ratio fillers. Such fillers can be organic or inorganic. In a further aspect, the high aspect fillers can be inorganic microfibers such as whiskers (highly crystalline small single crystal fibers) or somewhat less perfect crystalline fibers such as boron fibers, potassium titanate, calcium sulfate, asbestos and calcium metasilicate. Typical levels of these and other fillers include from about 10 phr to 100 phr or higher (where "phr" indicates parts by weight based on 100 parts of the elastomer). In various aspects, the composition can contain about 10-80, 30-70, 40-60, or 50-60 phr filler. In various aspects, the elastomer compositions comprise a silica filler. Typical levels of silica filler include from about 10 phr to 100 phr or higher. In various aspects, the compositions contain about 10-80, 30-70, 10-60, 40-60, 50-60, or 35-60 phr filler.

In certain aspects, the pigment can include, but is not limited to, inorganic pigments, e.g., titanium oxide, zinc oxide, zinc sulfide, ultramarine blue, cobalt blue, and organic dyes or pigments, e.g., phthalocyanines, anthraquinones, azo dyes, or carbon black, either individually or as a mixture. The amount of the colorants sufficient to achieve the desired color intensity, shade, and opacity, typically in amounts up to about 5% by weight of the thermoplastic composition. Further examples of suitable pigments that can be used include, but are not limited to, Hansa Yellow, phthalocyanine blue and green, quinacridones such as Red B, Red Y, Violet R, and Orange RK; also Cadmium Red, Chrome Yellow, Molybdate Orange, Ferric Oxide, Carbon Black, zinc sulfide, cadmium sulfide, calcium sulfide, and metallic pigments such as aluminum, bronze, and stainless steel flake. In some aspects, the pigment is of a type known in the art as an extender pigment, which include, but are not limited to, calcium carbonate, calcium silicate, mica, clay, silica, barium sulfate and the like.

In certain aspects, additive can be a softener (also referred to herein as a softening agent). Examples of suitable softeners include, but are not limited to, oxyethylation products of higher fatty acids, fatty alcohols, or fatty acid amides, N-stearyl-urea compounds and stearylamidomethylpyridinium.

In certain aspects, the additive can be a leveling agent. Examples of leveling agents include, but are not limited to, water-soluble salts of acidic esters obtained from polybasic acids and ethylene oxide or propylene oxide adducts of relatively long-chain base molecules capable of undergoing oxyalkylation.

In an aspect, the bladder includes at least one stress region that is capable of being subjected to mechanical stress. The stress region can be located on an outer surface of the bladder, an inner surface of the bladder, or both. The mechanical stress can be caused in numerous ways including, but not limited to, flexing the bladder, deforming the bladder, twisting the bladder, and the like, as a result of bladder being subject to pressure and/or strain. In an aspect, when the bladder is used in an article such as footwear, the mechanical stress can be caused by locomotion (e.g., running, walking, and the like). In an aspect, the stress region can be an area from about 0.01 $cm^2$ to 100 $cm^2$ or more depending upon the use of the bladder. In an aspect, the mechano-luminescent material composition and/or the second luminescent material can be included on some or all of the stress region. For example, when the bladder is used in an article such as footwear, the area can be 0.1 $cm^2$ to 10 $cm^2$. In an aspect, the article can include 1 to 100s or more of stress regions depending upon the use of the article and/or the desired outcome.

In an aspect, the stress region includes the mechano-luminescent composition. In this regard, when the bladder has the characteristic that when the stress region is under or subject to a mechanical stress, the mechano-luminescent material of the mechano-luminescent composition emits a first light as a result of the first mechanical stress. In an aspect, the bladder has one or more outer surfaces that are not entirely covered by an opaque material (i.e., are at least partially visible on an outer surface of the bladder or an article including the bladder). When the stress region is subject to a mechanical stress, the first light emitted from the mechano-luminescent material radiates out from one or more of the outer surfaces. For example, in an article, another portion of the article is not covering or otherwise blocking the first light from radiating out from the bladder and article. When the bladder is used in an article, such as footwear, one or more of the outer surfaces of the footwear (e.g., sole, upper, and the like) is not covered so that that first light radiates out from the article.

As stated above, the mechano-luminescent composition can be on the outer surface of the bladder, inner surface of the bladder, or both. When the mechano-luminescent composition is on the inner surface of the bladder, the mechano-luminescent composition can be transparent, translucent, or opaque. When the mechano-luminescent composition is on the outer surface, the mechano-luminescent composition can be transparent or translucent.

As used herein, in a transparent material, light passes through the material in straight lines and passes out of the material and one can see clearly through the material. For an opaque material, light does not pass through the material and one cannot see through the material at all. Translucent material is a material that falls between a transparent material and an opaque material, in that light passes through a translucent material but some of the light is scattered so that one cannot see clearly through the material.

In an aspect, the bladder wall includes a film including at least one polymeric layer or at least two or more polymeric layers. In an aspect, each of the polymeric layers can be about 0.1 to 40 mils in thickness. In an aspect, the mechano-luminescent composition can be present on a portion of an inner surface, an outer surface, or both of the one or more polymeric layers. In an aspect, the mechano-luminescent composition can be present between one or more pairs of polymeric layers of the film.

In an aspect, the polymeric layer can be formed of a thermoplastic material. In an aspect, the thermoplastic material can include an elastomeric material, such as a thermoplastic elastomeric material. In an aspect, the thermoplastic materials can include thermoplastic polyurethane (TPU). In an aspect, the thermoplastic materials can include polyester-based TPU, polyether-based TPU, polycaprolactone-based TPU, polycarbonate-based TPU, polysiloxane-based TPU, or combinations thereof. Non-limiting examples of thermoplastic material that can be used include: PELLETHANE™ 2355-85ATP and 2355-95AE (Dow Chemical Company of Midland, Mich.), ELASTOLLAN® (BASF Corporation) and ESTANE® (B.F. Goodrich Co.), all of which are either ester or ether based. Additional thermoplastic material can include those described in U.S. Pat. Nos. 5,713,141; 5,952,065; 6,082,025; 6,127,026; 6,013,340; 6,203,868; and 6,321,465, which are incorporated herein by reference.

In another aspect, the polymeric layer can be formed of one or more of the following: ethylene-vinyl alcohol copolymers (EVOH), poly(vinyl chloride), polyvinylidene polymers and copolymers (e.g., polyvinylidene chloride), polyamides (e.g., amorphous polyamides), acrylonitrile polymers (e.g., acrylonitrile-methyl acrylate copolymers), polyurethane engineering plastics, polymethylpentene resins, ethylene-carbon monoxide copolymers, liquid crystal polymers, polyethylene terephthalate, polyether imides, polyacrylic imides, and other polymeric materials known to have relatively low gas transmission rates. Blends and alloys of these materials as well as with the TPUs described herein and optionally including combinations of polyimides and crystalline polymers, are also suitable. For instance, blends of polyimides and liquid crystal polymers, blends of polyamides and polyethylene terephthalate, and blends of polyamides with styrenics are suitable.

Specific examples of polymeric materials of the polymeric layer can include acrylonitrile copolymers such as Barex® resins, available from Ineos; polyurethane engineering plastics such as Isoplast® ETPU available from Lubrizol; ethylene-vinyl alcohol copolymers marketed under the trademarks Eval™ by Kuraray, Soarnol™ by Nippon Gohsei, and Selar® OH by DuPont; polyvinylidiene chloride available from Dow Chemical under the tradename Saran™, and from Solvay under the tradename Ixan®; liquid crystal polymers such as Vectra® from Celanese and Xydar® from Solvay; MDX6 nylon, and amorphous nylons such as Novamid® X21 from DSM, Selar® PA from DuPont; polyetherimides sold under the tradename Ultem® by SABIC; poly (vinyl alcohol)s; and polymethylpentene resins available from Mitsui Chemicals under the TPX®.

In an aspect, each polymeric layer of the film can include a combination of thermoplastic materials. In an aspect, each polymeric layer of the film can be made of different types of thermoplastic materials. In as aspect, the mechano-luminescent material and/or the second luminescent material can be included in one or more of the polymeric layers.

In an aspect, the bladder can include a component that includes the mechano-luminescent material. The component has the characteristic that when the mechano-luminescent material is under a first mechanical stress the first light radiates out from the bladder. When the bladder is used in an article, one or more of the outer surfaces is not covered so that that first light radiates out from the article. In an aspect, the component can be a spacer formed of a solid polymeric material, a spacer formed of a foamed polymeric material, a spacer formed of a textile, a combination thereof or the like.

In an aspect, the component can include the mechano-luminescent material on at least on an outer surface, or that the mechano-luminescent material can be dispersed within the component. In a particular example, the component can be a spacer such as an injection molded article comprising a solid or foamed polymeric material including the mechano-luminescent material. In the example where the component is a spacer formed of a textile, the mechano-luminescent material can be present on an external surface of the textile, such as in a polymeric film or adhesive affixed to the textile, as a component of a fiber or yarn used to form the spacer textile, including a coating on a fiber or yarn.

In an aspect, the bladder can include a film that includes two or more polymeric layers, the second luminescent material and the mechano-luminescent material can be in separate polymeric layers, they can be in the same polymer layer, or they can be in some polymeric layers and not in other polymeric layers.

In another aspect, one of the second luminescent material and the mechano-luminescent material can be in one or more polymeric layers of the film and the other of the second luminescent material and the mechano-luminescent material can be in a coating layer (e.g., about 0.001 mm to 1 cm) on a surface of one or more of the polymeric layers of the film. In yet another aspect, both of the second luminescent material and the mechano-luminescent material can be in a coating layer (e.g., the same or different coating layers) on a surface of one or more of the polymeric layers of the film. In an aspect, the coating layer can be on an external or internal surface of the film, where the film defines an internal surface of the bladder or an exterior surface of the bladder. The coating layer can be formed using knows techniques.

In an aspect, the bladder can include a component that includes one of the second luminescent material and the mechano-luminescent material and the bladder includes the other of the second luminescent material and the mechano-luminescent material. In another aspect, the component includes the second luminescent material and the mechano-luminescent material. As described herein, the second luminescent material absorbs the first light and a second light is emitted from the second luminescent material. When the bladder is used in an article, one or more of the outer surfaces is not covered so that that second light radiates out from the article. In an aspect, the component can be a spacer formed of a solid polymeric material, a spacer formed of a foamed polymeric material, a spacer formed of a textile, a combination thereof or the like. In an aspect, the component can include the mechano-luminescent material and/or the second luminescent material on at least on an outer surface, or that the mechano-luminescent material and/or the second luminescent material can be dispersed within the component. In a particular example, the component can be a spacer such as an injection molded article comprising a solid or foamed polymeric material including the mechano-luminescent material and/or second luminescent material. In the example where the component is a spacer formed of a textile, the mechano-luminescent material and/or the second luminescent material can be present on an external surface of the textile, such as in a polymeric film or adhesive affixed to the textile, as a component of a fiber or yarn used to form the spacer textile, including a coating on a fiber or yarn.

In an aspect, the bladder can be made by applying a mechano-luminescent composition including one or more of mechano-luminescent materials and optionally a second luminescent material onto at least one stress region of the bladder. In an aspect, the mechano-luminescent composition and optionally the second luminescent material can be applied to an outer surface of the bladder, an inner surface of the bladder, or both.

When the bladder includes a film including two or more polymeric layers, the mechano-luminescent composition and optionally the second luminescent material can be applied on an inner surface of one or more of the polymeric layers, an outer surface of one or more of the polymeric layers, between one or more pairs of polymeric layers of the film, or a combination thereof. In an aspect, the mechano-luminescent material and the second luminescent material can be applied separately or in the same composition. In an aspect, the mechano-luminescent material and the second luminescent material can be applied to the same polymeric layer or to different polymeric layers. When the mechano-luminescent material and the second luminescent material are applied to different polymeric layers, the polymeric layers are adjacent one another.

In an aspect, the mechano-luminescent material and optionally the second luminescent material can be mixed with the components used to form the bladder. In an aspect, the bladder (e.g., one or more polymeric layers) can be formed using one or more polymers and forming the bladder using one or more processing techniques including, for example, extrusion, blow molding, injection molding, vacuum molding, rotary molding, transfer molding, pressure forming, heat sealing, casting, low-pressure casting, spin casting, reaction injection molding, radio frequency (RF) welding, and the like. In an aspect, the bladder can be made by co-extrusion followed by heat sealing or welding to give an inflatable bladder, which can optionally include one or more valves (e.g., one way valves) that allows the bladder to be filled with the fluid (e.g., gas).

Having described aspects herein, additional aspects are provided below.

Clause 1. An article comprising: a bladder including a volume of a fluid, wherein the bladder has a first bladder wall having a first bladder wall thickness, wherein the first bladder wall has a gas transmission rate of 15 $cm^3/m^2 \cdot atm \cdot day$ or less for nitrogen for an average wall thickness of 20 mils, wherein the bladder comprises a mechano-luminescent composition comprising one or more mechano-luminescent materials, and wherein the bladder has the characteristic that when the one or more mechano-luminescent materials is under a first mechanical stress, the mechano-luminescent material emits a first light.

Clause 2. The article of clause 1, wherein the bladder includes at least one stress region that is capable of being subjected to mechanical stress; wherein the stress region comprises the mechano-luminescent composition; and wherein the bladder has the characteristic that when the stress region is under the first mechanical stress, the mechano-luminescent material emits the first light as a result of the first mechanical stress.

Clause 3. The article of clauses 1 or 2, wherein the first bladder has one or more outer surfaces, and the first light emitted from the mechano-luminescent material radiates out from the one or more outer surfaces.

Clause 4. The article of any one of clauses 1-3, wherein the bladder includes a component that includes the mechano-luminescent material, and wherein the component has the characteristic that when the mechano-luminescent material is under a first mechanical stress the first light radiates out from the article.

Clause 5. The article of clause 4, wherein the component is selected from a spacer formed of a solid polymeric material, a spacer formed of a foamed polymeric material, a spacer formed of a textile, or a combination thereof.

Clause 6. The article of any one of clauses 1-5, wherein at least one stress region is located on an outer surface of the bladder, an inner surface of the bladder, or both.

Clause 7. The article of any one of clauses 1-6, wherein at least one stress region is located on an outer surface of the bladder and wherein the mechano-luminescent composition is transparent or translucent.

Clause 8. The article of any one of clauses 1-7, wherein the bladder wall includes a film including at least one polymeric layer.

Clause 9. The article of clause 8, wherein the mechano-luminescent composition is present on an inner surface, an outer surface, or both an inner surface and an outer surface of the one or more polymeric layers.

Clause 10. The article of any one of clauses 8-9, wherein the film includes two or more polymeric layers, and wherein the mechano-luminescent composition is present between one or more pairs of polymeric layers of the film.

Clause 11. The article of any of clauses 8-10, wherein the at least one polymeric layer is formed of a thermoplastic material.

Clause 12. The article of any of clauses 8-11, wherein the at least one polymeric layer is formed of an elastomeric material.

Clause 13. The article of clause 12, wherein the elastomeric material includes one or more thermoplastic polyurethanes.

Clause 14. The article of clause 12, wherein the elastomeric material includes one or more ethylene-vinyl alcohol copolymers.

Clause 15. The article of any one of clauses 8-14, wherein at least one polymeric layers comprise a first thermoplastic polymeric layer and a second thermoplastic layer.

Clause 16. The article of clause 15, wherein the first thermoplastic layer comprises one or more thermoplastic polyurethanes and the second thermoplastic layer comprises one or more thermoplastic ethylene-vinyl alcohol copolymers.

Clause 17. The article of clause 2, wherein the stress region is located on a surface within the bladder, and wherein the mechano-luminescent composition is transparent, translucent, or opaque.

Clause 18. The article of any one of clauses 1-17, wherein the bladder further comprises a second luminescent material.

Clause 19. The article of clause 13, wherein the second luminescent material is present in the mechano-luminescent composition.

Clause 20. The article of clauses 18 or 19, wherein the first light emitted from the mechano-luminescent material is absorbed by the second luminescent material and the second luminescent material emits a second light that radiates out from the article.

Clause 21. The article of clause 20, wherein the first light has a first intensity, the second light has a second intensity, and the second intensity is at least 10% greater than the first intensity.

Clause 22. The article of clauses 20 or 21, wherein the first light has a first duration, the second light has a second duration, and the second duration is at least 10% greater than the first duration.

Clause 23. The article of any one of clauses 18-22, wherein the second luminescent material and the mechano-luminescent material of the mechano-luminescent composition are mixed together.

Clause 24. The article of any one of clauses 18-23, wherein the second luminescent material and the mechano-luminescent material are located in proximity to each other.

Clause 25. The article of any one of clauses 18-24, wherein the bladder includes a film that includes two or more polymeric layers, wherein the second luminescent material and the mechano-luminescent material are in separate polymeric layers of the film.

Clause 26. The article of any one of clauses 18-24, wherein the bladder includes a film that includes two or more polymeric layers, wherein one of the second luminescent material and the mechano-luminescent material is in one or more polymeric layers of the film and the other of the second luminescent material and the mechano-luminescent material is in a coating layer on a surface of one or more of the polymeric layers of the film.

Clause 27. The article of any one of clauses 18-24, wherein the bladder includes a film that includes two or more polymeric layers, wherein both of the second luminescent material and the mechano-luminescent material are in a coating layer on a surface of one or more of the polymeric layers of the film.

Clause 28. The article of clauses 26 or 27, wherein the coating layer is on an external surface of the film, with the film defining an internal surface of the bladder or an exterior surface of the bladder.

Clause 29. The article of any one of clauses 18-24, wherein the bladder includes a component that comprises one of the second luminescent material and the mechano-luminescent material, wherein the bladder includes a film that includes the other of the second luminescent material and the mechano-luminescent material, and wherein the second light emitted from the second luminescent material radiates out from the article.

Clause 30. The article of any one of clauses 18-29, wherein the bladder includes a component that comprises the second luminescent material and the mechano-luminescent material, wherein the second light emitted from the second luminescent material radiates out from the article.

Clause 31. The article of clauses 28 or 29, wherein the component is selected from a spacer formed of a solid polymeric material, a spacer formed of a foamed polymeric material, a spacer formed of a textile, or a combination thereof.

Clause 32. The article of any one of clauses 1-31, wherein the article is a cushioning element.

Clause 33. The article of clause 32, wherein the article is a cushioning element for an article of apparel.

Clause 34. The article of clause 33, wherein the article of apparel is an article of footwear.

Clause 35. The article of clause 32, wherein the cushioning element is a component of a sole structure.

Clause 36. The article of any one of clauses 1-31, wherein the article is a cushioning element for an article of sporting equipment.

Clause 37. The article of any one of clauses 1-31, wherein the article is a cushioning element for a backpack.

Clause 38. The article of any one of clauses 1-37, wherein the fluid is a gas.

Clause 39. The article of clause 38, wherein the gas comprises $N_2$.

Clause 40. The article of any one of clauses 1 to 39, wherein the mechano-luminescent material is an aluminate mechano-luminescent material.

Clause 41. The article of clause 40, wherein the aluminate mechano-luminescent material is an alkaline earth aluminate mechano-luminescent material.

Clause 42. The article of clause 41, wherein the aluminate mechano-luminescent material is a strontium aluminate mechano-luminescent material.

Clause 43. The article of clause 43, wherein the strontium aluminate mechano-luminescent material comprises a mechano-luminescent material comprising strontium aluminate and europium.

Clause 44. The article of clause 41, wherein the alkaline earth aluminate mechano-luminescent material is represented by one of the following:
$M_xAl_2O_{3+x}$, $M_xQAl_{10}O_{16+x}$, $M_{x1}Q_{x2}Al_2O_{3+x1+x2}$ or $M_{x1}Q_{x2}LAl_{10}O_{16+x1+x2}$,
wherein each of M, Q and L are independently selected from an alkaline earth metal element, wherein x is a positive number larger than 0.8 but smaller than 1.0 and x1 and x2 are each 0 or a positive number with the proviso that (x1+x2) is a positive number larger than 0.8 but smaller than 1.0.

Clause 45. The article of clause 41, wherein the alkaline earth aluminate mechano-luminescent material is represented by one of the following: $xSrO \cdot yAl_2O_3 \cdot zMO$, wherein M is a divalent metal and x, y and z are integers; and $xSrO \cdot yAl_2O_3 \cdot zSiO_2$ wherein x, y and z are integers.

Clause 46. The article of any one of clauses 1-45, wherein the mechano-luminescent composition comprises one or more mechano-luminescent materials suspended in a polymeric matrix.

Clause 47. The article of any one of clauses 18-46, wherein the second luminescent material is a photoluminescent material having the characteristic of absorbing first light energy and emitting the second light energy in the visible light spectrum having a longer lifetime than the first light energy.

Clause 48. An article of footwear, comprising a sole structure, wherein the sole structure includes a bladder of clauses 1-47.

Clause 49. The article of footwear of clause 48, wherein the sole structure includes at least one opening, wherein the first light, the second light, or both radiate out from the opening.

Clause 50. An article of sporting equipment comprising at least one shoulder strap, wherein the at least one shoulder strap includes an article according to any one of clauses 1-47.

Clause 51. A method of making a bladder, comprising: providing a film, wherein the film has a gas transmission rate of 15 cm$^3$/m$^2$·atm·day or less for nitrogen for an average film thickness of 20 mils; applying heat, pressure and/or vacuum to the film, forming a bladder, the bladder including at least one stress region; and before, during or after the step of forming the bladder, applying a mechano-luminescent material composition including one or more of mechano-luminescent materials onto the film in at least one location, wherein, following the forming the bladder, the at least one location is a location of the at least one stress region; wherein the bladder has the characteristic that when the stress region is under a first mechanical stress, the mechano-luminescent material emits the first light as a result of the first mechanical stress.

Clause 52. A method of making a bladder, comprising: providing a bladder, wherein the bladder includes at least one stress region; and applying a mechano-luminescent material composition including one or more of mechano-luminescent materials onto at least one stress region, wherein the bladder has the characteristic that when the stress region is under a first mechanical stress, the mechano-luminescent material emits the first light as a result of the first mechanical stress.

Clause 53. The method of clause 52, wherein applying includes applying the mechano-luminescent material to at least one stress region located on an outer surface of the bladder, an inner surface of the bladder, or both.

Clause 54. The method of any one of clauses 51-53, wherein the bladder includes a film including two or more polymeric layers, wherein applying includes applying the composition on an inner surface of one or more of the polymeric layers, an outer surface of one or more of the polymeric layers, between one or more pairs of polymeric layers of the film, or a combination thereof.

Clause 55. The method of any one of clauses 51 to 54, wherein the composition includes a second luminescent material.

Clause 56. The method of clauses 51 or 52, further comprising: applying a second luminescent material to the bladder.

Clause 57. The method of clause 56, wherein the bladder includes a film including two or more polymeric layers, wherein applying the second luminescent material includes applying the second luminescent material on an inner surface of one or more of the polymeric layers, an outer surface of one or more the polymeric layers, between one or more pairs of polymeric layers of the film, or a combination thereof.

Clause 58. The method of clause 56, wherein applying the composition including the mechano-luminescent material includes applying the composition including the mechano-luminescent material to a first polymeric layer and wherein applying the second luminescent material includes applying the second luminescent material to a second layer of the polymeric layer, wherein the first layer and the second layer are different layers.

Clause 59. The method of clause 58, wherein the first layer and second layer are adjacent one another.

Clause 60. A bladder comprising: a product of the method of clauses 51 to 58.

Clause 61. A method of making an article of footwear, comprising: providing an upper, providing a bladder of any one of clauses 1 to 47; and affixing the upper and the bladder to one another.

Clause 62. An article of footwear comprising: a product of the method of clause 61.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an aspect, the term "about" can include traditional rounding according to significant figures of the numerical value. In addition, the phrase "about 'x' to 'y'" includes "about 'x' to about 'y'".

Many variations and modifications may be made to the above-described aspects. All such modifications and variations are intended to be included herein within the scope of this disclosure and protected by the following claims.

I claim:
1. An article comprising:
   a bladder including a volume of a fluid, wherein the bladder has a bladder wall having a first bladder wall thickness, wherein the bladder comprises a mechano-luminescent composition comprising one or more mechano-luminescent materials;
   wherein the mechano-luminescent composition is present on an inner surface of the bladder wall, is present between one or more polymeric layers of the bladder wall, or on a component within the bladder; and
   wherein the bladder has the characteristic that when the one or more mechano-luminescent materials is under a first mechanical stress, the mechano-luminescent material emits a first light, and the first light emitted from the mechano-luminescent material radiates out from one or more outer surfaces of the article,
   wherein the first light emitted from the mechano-luminescent material is absorbed by the second luminescent material and the second luminescent material emits a second light that radiates out from the article; and wherein the first light has a first intensity, the second light has a second intensity, and the second intensity is at least 10% greater than the first intensity; or wherein the first light has a first duration, the second light has a second duration, and the second duration is at least 10% greater than the first duration; or
   wherein the second luminescent material is a photoluminescent material having the characteristic of absorbing the first light energy and emitting the second light energy in the visible light spectrum having a longer lifetime than the first light energy.

2. The article of claim 1, wherein the first bladder has one or more outer surfaces, and the first light emitted from the mechano-luminescent material radiates out from the one or more outer surfaces.

3. The article of claim 1, wherein the component includes the mechano-luminescent material, and wherein the component has the characteristic that when the mechano-luminescent material is under a first mechanical stress the first light radiates out from the article.

4. The article of claim 1, wherein the film includes two or more polymeric layers.

5. The article of claim 4, wherein the at least one polymeric layer comprises a thermoplastic polyurethane.

6. The article of claim 5, wherein at least one polymeric layer comprises an elastomeric material, wherein the elastomeric material is an ethylene-vinyl alcohol copolymers.

7. The article of claim 1, wherein the mechano-luminescent composition comprises one or more mechano-luminescent materials suspended in a polymeric matrix.

8. The article of claim 1, wherein the bladder further comprises a second luminescent material.

9. The article of claim 1, wherein the mechanoluminescent material is an aluminate mechano-luminescent material.

10. The article of claim 1, wherein the article is a cushioning element.

11. The article of claim 10, wherein the article is a cushioning element for an article of apparel.

12. The article of claim 11, wherein the article of apparel is an article of footwear.

13. The article of claim 10, wherein the cushioning element is a component of a sole structure.

14. The article of claim 1, wherein the article is a cushioning element for an article of sporting equipment.

15. The article of claim 1, wherein the article is a cushioning element for a backpack.

16. A method of making a bladder, comprising:
providing a bladder, wherein the bladder has a bladder wall having a first bladder wall thickness, wherein the mechano-luminescent composition is present on an inner surface of the bladder wall, is present between one or more polymeric layers of the bladder wall, or on a component within the bladder; and
applying a mechano-luminescent material composition including one or more of mechano-luminescent materials onto at least one an inner surface of the bladder wall, is present between one or more polymeric layers of the bladder wall, or on a component within the bladder,
wherein the bladder has the characteristic that when at least one an inner surface of the bladder wall, is present between one or more polymeric layers of the bladder wall, or on a component within the bladder is under a first mechanical stress, the mechano-luminescent material emits the first light as a result of the first mechanical stress,
wherein the first light emitted from the mechano-luminescent material is absorbed by the second luminescent material and the second luminescent material emits a second light that radiates out from the article; and wherein the first light has a first intensity, the second light has a second intensity, and the second intensity is at least 10% greater than the first intensity; or wherein the first light has a first duration, the second light has a second duration, and the second duration is at least 10% greater than the first duration; or
wherein the second luminescent material is a photoluminescent material having the characteristic of absorbing the first light energy and emitting the second light energy in the visible light spectrum having a longer lifetime than the first light energy.

17. The method of claim 16, wherein the step of providing the bladder comprises
providing a film, wherein the film has a gas transmission rate of 15 cm$^3$/m$^2$·atm·day or less for nitrogen for an average film thickness of 20 mils;
applying heat, pressure, vacuum, or a combination thereof to the film, forming a bladder, the bladder including at least one stress region; and
wherein the step of applying the mechano-luminescent material composition including one or more of mechano-luminescent materials onto at least one an inner surface of the bladder wall, is present between one or more polymeric layers of the bladder wall, or on a component within the bladder comprises before, during or after the step of forming the bladder, applying the mechano-luminescent material composition including one or more of mechano-luminescent materials onto the film in at least one location, wherein, following the forming the bladder, the at least one location is a location of the at least one an inner surface of the bladder wall, is present between one or more polymeric layers of the bladder wall, or on a component within the bladder.

* * * * *